United States Patent [19]

Janicke

[11] Patent Number: 4,495,393
[45] Date of Patent: Jan. 22, 1985

[54] FLUID JETSTREAM THREADING MECHANISM AND METHOD FOR TRAVELLING WIRE EDM APPARATUS

[75] Inventor: Johan Janicke, La Roche-sur-Foron, France

[73] Assignee: Ateliers des Charmilles S.A., Geneva, Switzerland

[21] Appl. No.: 332,978

[22] Filed: Dec. 21, 1981

[51] Int. Cl.³ .................................................. B23P 1/08
[52] U.S. Cl. ............................. 219/69 M; 219/69 D; 219/69 W
[58] Field of Search .............. 219/69 W, 69 M, 69 D, 219/69 E, 69 R

[56] References Cited

U.S. PATENT DOCUMENTS 3,891,819  6/1975  Ullmann et al. .
3,987,270  10/1976  Ullmann et al. .

FOREIGN PATENT DOCUMENTS 5610130  3/1981  Japan .

Primary Examiner—M. H. Paschall
Attorney, Agent, or Firm—Hauke and Patalidis

[57] ABSTRACT

A method and apparatus for threading or rethreading the end of an electrode wire through an aperture in a workpiece in which a cut is to be effected, by electrical discharges in a machining zone between the electrode wire and the workpiece. While the end of the electrode wire is brought in proximity with the inlet of the aperture in the workpiece, the end of the electrode wire is disposed in a pressurized fluid flowing towards the inlet of the aperture in the workpiece such that the end of the electrode wire is automatically centered relative to the aperture, and threading the end of the wire through the aperture.

8 Claims, 7 Drawing Figures

FLUID JETSTREAM THREADING MECHANISM AND METHOD FOR TRAVELLING WIRE EDM APPARATUS

BACKGROUND OF THE INVENTION

The present invention relates to an apparatus and method for threading the end of the wire electrode of a travelling wire EDM apparatus through a pre-drilled aperture in the workpiece, or through the cut previously machined by electrical discharges in the workpiece, in the event of rethreading the electrode wire after rupture. More specifically, the present invention relates to a method and mechanism for threading the end of the electrode wire through the workpiece by entraining and centering the end of the electrode wire by a fluid jetstream directed towards the aperture in the workpiece.

It is known, in travelling wire EDM technology, to utilize a fluid jetstream for threading an electrode wire through an aperture in a workpiece. In U.S. Pat. Nos. 3,891,819 and 3,987,270 and in Japanese patent publication No. 56-10130, there are disclosed electrode wire threading devices comprising a nozzle through which the end of the electrode wire is fed longitudinally by a mechanical wire feeding device, the nozzle being directed towards the threading aperture in the workpiece and being supplied with a fluid under pressure such as to cause the fluid to flow in the form of a jetstream directed towards the threading aperture and coaxially surrounding the electrode wire. The end of the electrode wire is guided by the fluid jetstream and is, at least partially, driven towards the threading aperture in the workpiece as a result of the skin friction effect between the jetstream of fluid and the peripheral surface of the electrode wire.

In such electrode wire threading arrangements, the threading aperture through the workpiece does not play any active part. On the contrary, the threading aperture itself presents an obstacle to effective threading of the electrode wire end, especially when the threading aperture is narrower than the jetstream provided by the nozzle located proximate the inlet of the threading aperture. This is due to the fact that the fluid jetstream becomes partially broken and disturbed at the edge of the threading aperture, and the fluid jetstream jacketing the electrode wire effectively guides and drives the wire only in the short free space between the nozzle outlet and the inlet of the threading aperture through the workpiece. Under such conditions, it is evident that if the longitudinal axis of the electrode wire does not coincide exactly with the longitudinal axis of the threading aperture, chances are that the end face of the wire impinges on the edge of the aperture and the wire is caused to bend, proximate its end, under the action of the force exerted on the wire by the mechanical wire feeding device. It has been found experimentally that, because of the inconveniences hereinbefore mentioned of the prior art threading mechanisms, such threading mechanisms do not permit to thread, or re-thread, an electrode wire of very small size, as small as, for example 0.1 mm, through a threading aperture two or three times the size of the wire, such as, for example, 0.2 to 0.3 mm in diameter. The end of the wire is often not disposed concentric to the jetstream and consequently not concentric to the threading aperture because the wire is generally lacking in straightness because, for example, it is supplied from a relatively small diameter spool, or has been subjected to stress.

It has been suggested to straighten the electrode wire, prior to threading it through a threading aperture in a workpiece, by heating the wire while simultaneously stretching the wire. This process is particularly convenient for straightening wires made of copper and of alloys containing a high proportion of copper. Copper melts at about 1,000° C. and, when subjected to low stress, it is capable of drastic deformation at a temperature of the order of 600° C. By contrast, wires made of tungsten and/or molybdenum have a melting temperature of about 3,000° C., and it is very difficult, if not impossible, to subject such wires to an appropriate thermal treatment.

It is evident that any automatic wire threading mechanism, even if far from being perfect, can accomplish satisfactory threading operations on the condition that the size of the threading aperture through the workpiece is several order of magnitudes, for example five times, that of the wire. However, pre-drilling an aperture of such a size through the workpiece requires time and, often, it is not possible to pre-drill an aperture of large size because the cut in the workpiece does not permit to accommodate a starting aperture of such large dimension. The modern trend to miniaturization often requires that stamping or extrusion dies be made of elements having very small lateral dimensions, for example, from 0.1 to 0.2 mm. In order not to run the risk of irremediably damaging the workpiece and being forced to scrap it, the threading aperture through the workpiece must be of a size which can be accommodated within the largest dimension of the opening within the confines of the die walls. Therefore, there is often a requirement for forming a threading orifice through a workpiece of a size which is hardly larger than the size of the electrode wire, with the accompanying difficulties of threading the electrode wire through such a small size aperture presenting a problem which cannot be resolved by the prior art threading mechanisms and methods.

SUMMARY OF THE INVENTION

The principal object of the present invention is to eliminate the inconveniences of the prior art and to provide automatic threading of the end of the electrode wire of a travelling wire EDM apparatus through a threading aperture in the workpiece of a size hardly larger than the size of the electrode wire. The present invention accomplishes its object by providing a high pressure, high velocity flow of fluid converging towards the inlet of the threading aperture through the workpiece, bringing the end of the wire into the converging flow of fluid, and feeding the end of the wire through the aperture.

These and other objects and advantages of the present invention will become apparent to those skilled in the art when the following description of the best modes contemplated for practicing the invention is read in conjunction with the accompanying drawing, wherein like reference numerals refer to like or equivalent elements, and in which:

DETAILED DESCRIPTION OF THE PREFERRED EMBODIMENTS

Figures 1, 2:
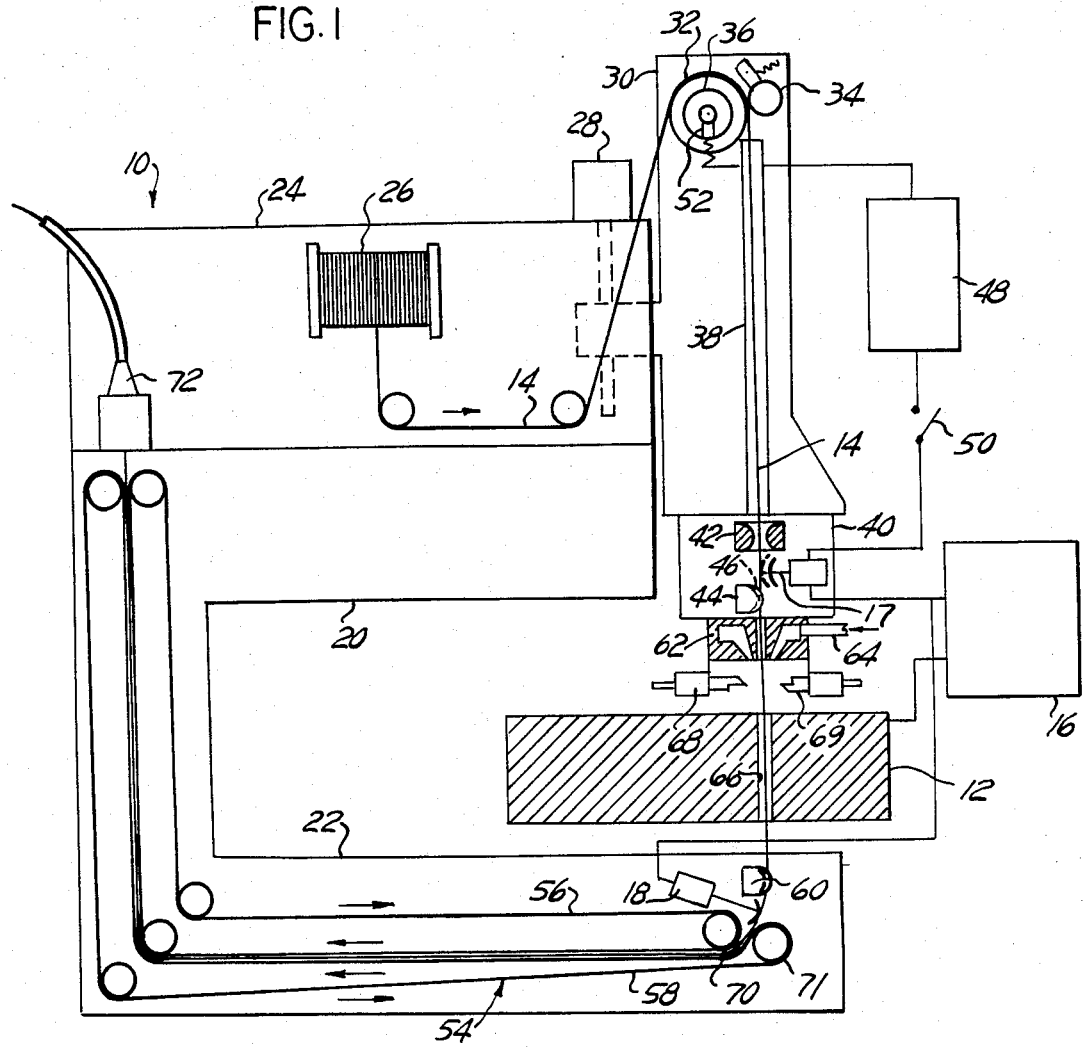
FIG. 1 is a schematic illustration of a travelling wire EDM apparatus provided with a fluid jetstream threading mechanism.
FIG. 2 is a schematic representation of a prior art fluid jetstream threading mechanism useful in illustrating one of the important inconveniences of the prior art.

As schematically illustrated at FIG. 1, a travelling wire EDM apparatus 10, as is well known in the art, permits to effectuate a cut in a workpiece 12 by means of an electrode wire 14. A voltage pulse generator 16 is connected across the workpiece 12 and the electrode wire 14 by having one of its terminals connected to the workpiece 12 and its other terminal connected to a pair of sliding contacts 17 and 18, one disposed above the workpiece 12 and the other below the workpiece. As is well known in the art, voltage pulses applied across the workpiece 12 and the electrode wire 14 trigger machining electrical discharges in the gap, or machining zone, between the electrode wire 14 and the workpiece 12, such as to effectuate a cut in the workpiece 12 which is displaced along cross axes relative to the electrode wire 14 by means of appropriate servo motors, not shown, under the control of a numerical control, also not shown.

The EDM apparatus 10 has an upper arm 20 extending generally above the workpiece 12 and a lower arm 22 extending generally below the workpiece 12. The upper arm 20 supports a panel 24 on which are mounted a spool 26 for which is supplied the electrode wire 14 and a motor 28 that vertically reciprocates a slide 30. The slide 30 supports, proximate its top, a pulley or roller 32 around which is wound the wire 14, a spring-urged pinch roller 34 constantly maintaining the electrode wire 14 against the peripheral surface of the pulley or roller 32. A motor 36 may be operated in a brake mode by applying a torque to the pulley or roller 32 which opposes its rotation. After leaving the pulley or roller 32, the electrode wire 14 is fed through a guiding tube 38 which brings the wire to a block 40 supporting a first and second wire guide members, 42 and 44 respectively, disposed upstream, or above, the workpiece 12. Between the two upstream wire guide members 42 and 44 is disposed a sliding contact 17, shown in full lines in a retracted position, which, in its extended position shown in dashed lines, engages the peripheral surface of the electrode wire 14 and forces it to engage the bottom of a guiding V-groove 46 formed in the surface of the guide member 44. In addition to connecting the electrode wire 14 to a terminal of the pulse generator 16, the sliding contact 17 connects a portion of the wire, corresponding roughly to the portion passing through the guiding tube 38, across an electrical power supply 48, one terminal of the electric power supply 48 being connected to the sliding contact 17 through a switch 50 and the other terminal being connected, for example, to the shaft of the pulley or roller 32 by means of a rotary contact 52, the pulley or roller 32 being made of an electrically conductive metal or metal alloy. In this manner, electric current flowing between the sliding contact 17 and the rotary contact 52 through the corresponding length of electrode wire 14 permits to heat that length of wire such as to anneal it and to straighten it as a result of the pull exerted on the wire between the pulley and roller 32, with its free rotation as opposed by the motor-brake 36, and a wire conveyor system 54 disposed below the workpiece 12, mounted on the EDM apparatus lower arm 22. In this manner, electrode wires made of copper or of alloys rich in copper are straightened by thermal treatment between the sliding contact 17 and the rotary contact 52 prior to passage through the workpiece 12.

The wire conveyor 54 comprises a pair of endless conveyor belts, designated respectively 56 and 58, between which the electrode wire 14 is captured and driven after passage through the workpiece 12. During its passage through the workpiece 12 the wire is held taut between the upstream guide member 44 and a downstream guide member 60 mounted on the lower arm 22 below the workpiece 12.

Below the upstream wire guide member 44, and prior to its passage through the workpiece 12, the electrode wire 14 is passed through a coaxial fluid nozzle 62 mounted below the block 40. The coaxial fluid nozzle 62 is provided in fluid under pressure, gaseous or liquid fluid, by a conduit 64. The fluid flowing at high velocity through the coaxial nozzle 62 forms a jetstream surrounding the electrode wire which, as a result of flowing at high velocity towards an aperture 66 formed through the workpiece 12, creates hydradynamic forces which tend to maintain the electrode wire 14 in the center of the jetsream and aid in transporting it towards the inlet of the aperture 66 in the workpiece 12. Prior to being threaded through the aperture 66 in the workpiece 12, the end of the wire is held and guided by the fluid jetstream and pulled by the jetstream towards the inlet of the aperture 66 while being simultaneously fed downwardly by the pulley or roller 32 driven by the motor 36 functioning in a motor mode. Although the action of the jetstream on the wire 14 causes a pull to be exerted on the wire, the wire is prevented from sliding around the peripheral surface of the pulley or roller 32 by the pinch roller 34. The coaxial nozzle 62, during machining of the workpiece 12, may be supplied in dielectric fluid such as to force the dielectric fluid to flow in the machining zone between the electrode wire 14 and the workpiece 12.

A pair of power-actuated wire cutters 68 and 69, for trimming the end of the electrode wire 14 prior to threading or rethreading the wire through the aperture 66 in the workpiece 12, are mounted below the coaxial nozzle 62. During a threading, or rethreading operation, after the end of the electrode wire 14 has been passed through the aperture 66 in the workpiece 12 it is caught at the entrance of the wire conveyor system 54, between a pair of pulleys or rollers 70 and 71, the endless conveyor belt 58 winding around the pulley or roller 71. The used wire is thus carried between the conveyor belts 56 and 58 of the conveyor system 54 to an evacuation tube 72 for disposal of wire outside of the EDM apparatus 10, or for winding on a receiving reel or spool. The pulleys or rollers 70 and 71 of the conveyor system 54 may be power driven or some of the other pulleys or rollers supporting the conveyor belts 56 and 58 may be power driven, at a substantially constant speed such as to apply on the electrode wire 14 a constant pull opposed by the motor 36 coupled to the pulleys or roller 32 operating in a brake mode. By adjusting to an appropriate value the braking force exerted by the motor 36 upon the pulley or roller 32, and consequently upon the electrode wire 14, the pulling force exerted on the electrode wire is thus adjusted. The entrance, between the pulleys or rollers 71 and 70, to the belt conveyor 54 is slightly off-center so that, as soon as the end of the electrode wire 14 is grabbed by the belt conveyor 54, the wire is laterally displaced such as to engage the support and guide member 60 and the face of the electrical sliding contact 18.

The coaxial electrode wire feed nozzle 62, according to the prior art, presents a predominant inconvenience which is schematically illustrated at FIG. 2. The coaxial nozzle 62 produces a fluid jetstream, arbitrarily shown at 74, which surrounds the electrode wire 14 and maintains it substantially coaxial within the jetstream 74. The jetstream 74 is substantially cylindrical and has a diameter which is slightly larger than the diameter of the aperture 66 through the workpiece 12. The jetstream 74, therefore, impinges upon the surface of the workpiece 12 surrounding the edge 82 of the aperture 66 and is diverged, as arbitrarily shown by the arrows 76. Consequently, if the electrode wire 14 is slightly bent at its end, as shown at 78, due to a small permanent bend of small radius, the end face 80 of the electrode wire, instead of being introduced within the aperture 66, fits the edge 82 of the aperture and is prevented from being threaded through the aperture. Because the force exerted on the electrode wire 14 by the jetstream 74 of fluid is not strong enough to straighten the wire, the end of the wire 14 remains trapped at the inlet of the aperture 66 through the workpiece 12 which, as previously mentioned, is a very small size aperture, hardly larger than the wire 14 itself.

Figure 3:
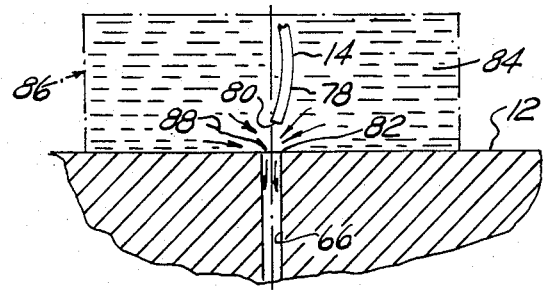
FIG. 3 is a view similar to FIG. 2 but illustrating the principle of the present invention.

FIG. 3 schematically illustrates the principle of the present invention for threading an electrode wire 14 through an aperture 66 in a workpiece 12. A fluid 84 under a relatively high pressure is supplied to the interior of an enclosure 86 surrounding the end of the electrode wire 14, such that the fluid 84 is caused to flow, as represented by the arrows 88, in converging streams towards the inlet of the aperture 66. By simultaneously mechanically feeding the electrode wire 14 longitudinally toward the inlet of the aperture 66, and as a result of fluid flow urging through hydrostatic forces, the end of the electrode wire 14 becoxes aligned with the axis of the aperture 66 while approaching the inlet of the aperture 66, and the end face 80 of the wire is prevented from engaging the edge 82 of the aperture 66 and is easily introduced into the aperture. Consequently, the inconveniences of the prior art arrangements, FIG. 2, are eliminated. The self-centering of the electrode wire 14 is accomplished only if a sufficient volume of pressurized fluid 84 is supplied to the enclosure 86, such that the flow lines of the fluid proximate the surface of the workpiece 12 are almost horizontal and converge rapidly towards the inlet of the aperture 66, radially from all directions. The pressurized fluid 84 may be compressed air, water, oil, or even a paste. The greater the viscosity of the fluid, the more intense are the hydrodynamic forces causing the self-centering of the electrode wire end relative to the axis of the aperture 66 in the workpiece 12.

In order to practice the present invention, the inlet of the aperture 66 through the workpiece 12 is covered by the leak-proof enclosure 86 to which the fluid 84 under pressure is supplied. As previously mentioned, it is preferable to provide the enclosure 86 with a relatively large volume, such that a high velocity flow of the fluid is established with radial convergence towards the inlet of the aperture 66 in the workpiece 12. In other words, the internal diameter of the enclosure 86 must be substantially larger than the diameter of the threading aperture 66.

Figure 4:
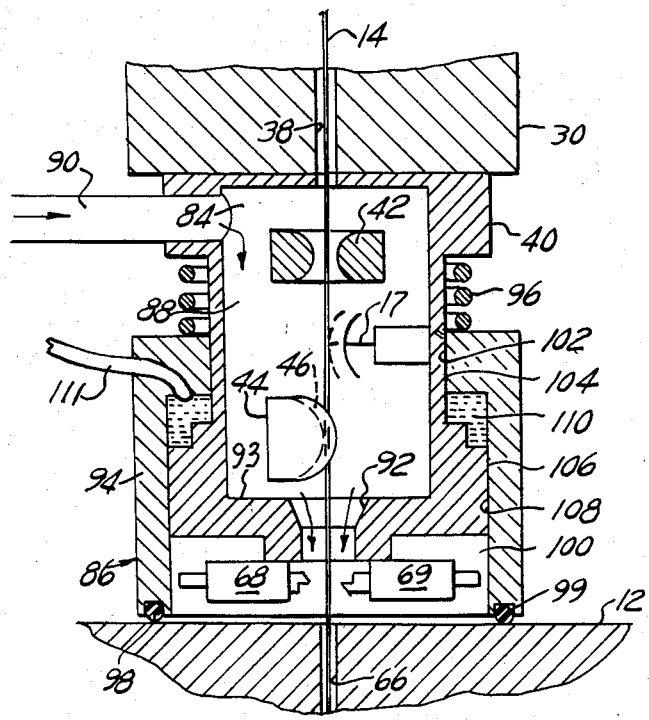
FIG. 4 is an example of structure for practicing the method of the present invention.

FIG. 4 illustrates an example of structure according to the present invention. The block 40 of the travelling wire EDM apparatus 10 of FIG. 1, in which are mounted the electrode wire guide members 42 and 44 and the retractable sliding contact 17, defines a chamber 88 supplied in pressurized fluid by a conduit 90. The pressurized fluid introduced in the chamber 88 in the block 40 is caused to flow through a funnel-shaped nozzle 92 disposed through the bottom wall 93 of the block 40. The wire cutters 68 and 69 are mounted below the block 40. As the slide 30 supporting at its bottom the block 40 can be displaced vertically, the slide 30 is displaced downwardly prior to a rethreading operation such that the wire cutters 68 and 69 are disposed proximate the upper surface of the workpiece 12.

The block 40 is substantially cylindrical and supports the enclosure 86 which takes the form of a sleeve 94 slidably disposed surrounding the block 40 proximate its lower end. The sleeve 94 is urged downwardly by a coil spring 96, such that when the slide 30 is displaced downwardly the coil spring 96 urges the bottom of the sleeve 94, provided with an O-ring 98, disposed in an annular groove 99, in firm engagement with the surface of the workpiece 12. The pressurized fluid 84 introduced through the conduit 90 into the chamber 88 is caused to flow at high velocity through the nozzle 92 into a chamber 100 formed below the block 40 by the sleeve 94 defining the enclosure 86. During a threading operation, as the electrode wire 14, after its end has been neatly cut off by the wire cutters 68 and 69, is pushed downwardly through the tube 38, the end of the wire is automatically centered by the radial flow of the fluid in the chamber 100 converging towards the inlet of the aperture 66 in the workpiece 12. As previously mentioned, the electrode wire 14 is fed downwardly through the tube 38 by the pulley or roller 32 driven in rotation by the motor 36, FIG. 1, the pinch roller 34 ensuring engagement of the electrode wire 14 with the surface of the pulley or roller 32.

The flow of the fluid through the nozzle 92 at the bottom of the block 40 also exerts a pull on the electrode wire 14, and for that purpose it is preferable that the pressurized fluid 84 be very viscous, such as for example a silicone base oil. After the end of the electrode wire 14 has been passed through the threading aperture 66 in the workpiece 12, the end of the wire is, as previously mentioned, grabbed by wire conveyor 54, FIG. 1, and a cut may then be effected in the workpiece 12 by electrical discharges.

Unless the fluid 84 is the dielectric fluid used for effecting a cutting operation on the workpiece by electrical discharges, the flow of pressurized fluid used for the threading or rethreading operation is interrupted and replaced by an appropriate dielectric fluid being fed by the conduit 90 consecutively into the chamber 88 in the block 40 and the chamber 100 in the sleeve 94.

During a cutting operation, it is desirable to lift the sleeve 94 such that its end provided with the O-ring 98 no longer engages the surface of the workpiece 12, for the purpose of avoiding the formation of gas bubbles in the chamber 100. Such an arrangement is necessary because gas bubbles, in an enclosure containing a fluid under pressure, may rupture the relatively fragile electrode wire 14 by impact upon the wire. In the alternative, and in addition, the gas contained in the chamber 100 may cause a risk of explosion.

For the purpose of lifting the sleeve 94 relative to the block 40, the sleeve 94 is provided with an internally projecting radial shoulder 102 in sliding engagement with a reduced diameter peripheral portion 104 of the block 40, and the block 40 is provided with an outwardly projecting annular portion 106 in sliding engagement with the inner bore surface 108 of the sleeve 94. The shoulder portion 106 of the block 40 and the annular portion 102 of the sleeve 94 form therebetween an annular chamber 110 in which fluid under pressure may be introduced through a conduit 111, with the result that the sleeve 94 is displaced upwardly relative to the block 40, thus compressing the coil spring 96, and opening the chamber 100 to the ambient such as to allow gas that may form in the chamber 100, during cutting of the workpiece 12 by electrical discharges to escape to the atmosphere.

Figure 5:
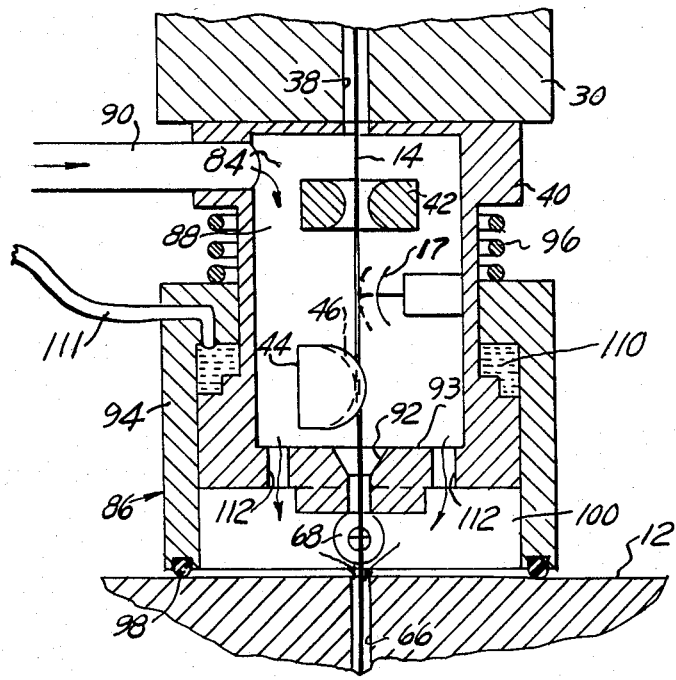
FIG. 5 is a view similar to FIG. 4 but showing a modification thereof.

FIG. 5 illustrates a modification of the invention wherein the pressurized fluid 84 introduced into the chamber 100 formed in the sleeve 94 defining the enclosure 86 is fed through a plurality of orifices 112 disposed through the bottom of the block 40 in a circular row around the nozzle 92. Two of such orifices 112 are shown. The nozzle 92 is considerably reduced in diameter, as compared to the nozzle 92 of FIG. 4, such that most of the pressurized fluid 84 is caused to flow from the chamber 88 into the chamber 100 through the orifices 112 such as to create a strong current of fluid converging towards the inlet of the aperture 66 in the workpiece 12. In order to clarify the structure illustrated at FIG. 5, the wire cutters have been rotated 90° such that their axis is now perpendicular to the plane of the drawing and a single wire cutter 68 is shown.

Figure 6:
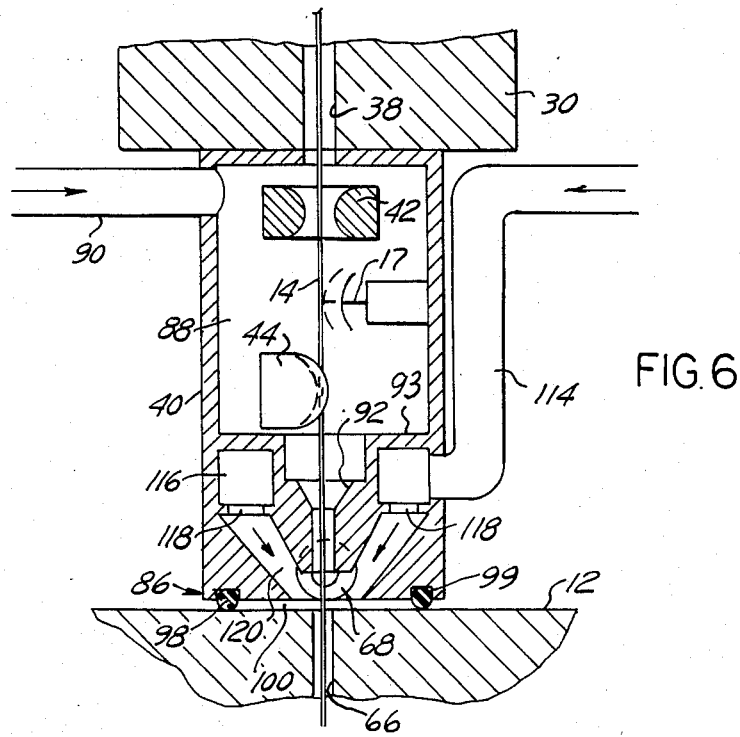
FIG. 6 is a view similar to FIG. 4 but showing a further modification thereof.

FIG. 6 illustrates a further modification of the invention which presents two advantages. In the structure of FIG. 6, the block 40 mounted on the end of the slide 30 is provided at its bottom with the groove 99 in which is disposed the O-ring 98. The motor 28, FIG. 1, reciprocating the slide 30 is preferably provided with a torque limiting mechanism such that when the slide 30 is driven downwardly, the force applied by the block to the workpiece 12 is limited, but is still sufficient to prevent leakage of fluid past the O-ring 98. The chamber 88 in the block 40 is supplied in dielectric fluid through the line 90. The dielectric fluid is caused to flow from the chamber 88 through the funnel-shaped nozzle 92 to supply dielectric fluid to the machining zone between the electrode wire 14 and the workpiece 12 during a cutting operation. During a threading, or rethreading, operation, a separate threading fluid under pressure is supplied via a line 114 to an annular passageway 116 disposed in the bottom wall 93 of the block 40 separate from the chamber 88. From the annular passageway 116, the threading fluid is supplied at high velocity and under pressure through a plurality of ports 118 to a converging nozzle 120. As the fluid emerging into the chamber 100, formed at the bottom of the block 40 within the parameter limited by the O-ring 98, can escape only through the aperture 66 in the workpiece 12, the flow of fluid from the converging nozzle 120 is forced to impinge uniformly around the periphery of the end of the electrode wire 14, thus maintaining the end of the wire well centered for passage through the threading aperture 66.

The advantage of the arrangement of FIG. 6 is that the threading fluid is prevented from being introduced into the chamber 88 in the block 40, and that a separate fluid having a high viscosity can be used for threading, or rethreading, the electrode wire 14 through the aperture 66 in the workpiece 12 without being introduced in the chamber 88 in which are mounted the wire guide members 42 and 44 and the sliding contact 17. There is therefore no risk of contaminating the interior of the chamber 88 with a fluid which could interfere with a good electrical contact being established between the face of the sliding contact 17 and the electrode wire 14, or interfering with the functioning of the wire guide members 42 and 44. A very thick fluid may therefore be used for threading the electrode wire, or even a pasty fluid, such as to provide substantially high hydrostatic forces acting upon the electrode wire to center it relative to the axis of the aperture 66 in the workpiece 12.

Figure 7:
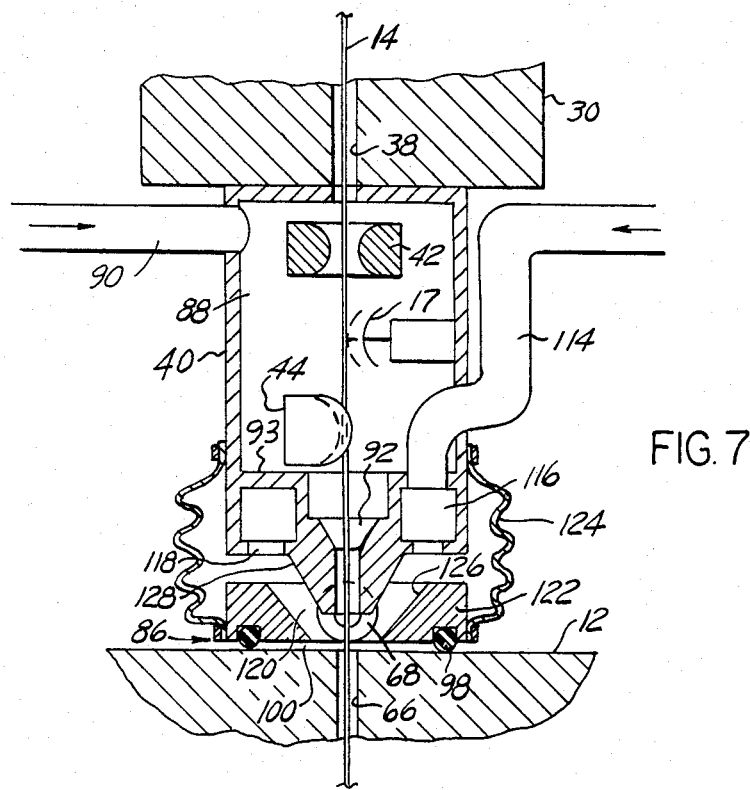
FIG. 7 is a view similar to FIG. 4 but showing another modification thereof.

In the arrangement of FIG. 7, the block 40 mounted on the end of the slide 30 supports a separate ring 122 by means of an extensible resilient bellows 124. The bottom wall 93 of the block 40 is provided with the annular passageway 116 supplied in threading fluid by the conduit 114. The ring 122, which is provided on its lower face with the O-ring 98, has a converging funnel-shaped opening 126 disposed concentrically to a frusto-conical projecting portion 128 disposed coaxially with the dielectric fluid nozzle 92, such that the converging threading nozzle 120 is formed between the funnel-shaped aperture 126 in the ring 122 and the conical surface of the frusto-conical projection 128 on the lower face of the block 40. When threading fluid under pressure, introduced in the annular passageway 116 via the conduit 114, flows through the ports 118 into the interior of the bellows 124, the pressure causes the ring 122 to be displaced downwardly such as to engage the O-ring 98 with the surface of the workpiece 12. The threading fluid flowing at high velocity through the converging nozzle 120 centers the end of the electrode wire 14 relative to the aperture 66 in the workpiece 12. After a threading, or rethreading, operation has been effected, the flow of threading fluid through the conduit 114 is cut off, thus releasing the pressure within the bellows 124. The bellows 124 is preferably a metallic bellows which, when subjected to internal pressure, is caused to expand, and which is caused to retract when no longer subjected to internal pressure, with the result that when threading fluid is no longer admitted to the interior of the bellows 124, the ring 122 is retracted upwardly.

After a threading operation has been effected, dielectric fluid is admitted to the interior chamber 88 in the block 40 by the conduit 90, and the dielectric fluid is caused to flow through the nozzle 92 to continuously bathe the electrode wire 14 while passing through the machining zone between the wire and the workpiece 12, without causing any dielectric fluid flow into the bellows 124. The bellows 124 thus remains contracted during a machining operation with the result that the ring 122 is retracted from the surface of the workpiece 12. The wire cutter knives, such as cutter knife 68, may be mounted directly within the tapered opening 120 in the ring 122, such that the wire cutter knife may be disposed proximate the inlet of the threading aperture 66 through the workpiece 12.

The invention permits to thread the electrode wire 14 through the cut effected in the workpiece 12 in the event of accidental rupture of the wire. Under such conditions, it is advantageous to use the wire cutter for neatly trimming the end of the wire. The fluid introduced under high pressure in the enclosure 86 permits to flush the end of the electrode wire and any other machining debris through the cut in the workpiece.

It will be readily appreciated by those skilled in the art that the present invention presents the principal advantage of centering the end of an electrode wire with an aperture through which the wire is threaded, in a travelling wire EDM apparatus, prior to effecting a cut in the workpiece, even though the end of the electrode wire, prior to threading, is accidentally out of center. The present invention permits automatic threading of the electrode wire even though there may be slight errors of alignment due to the EDM apparatus itself or, as is usually the case, due to the end of the wire being not quite straight Bends in the wire may be caused by the wire having been stored on a spool of relatively small diameter, or by the metallurgy of the wire which makes it almost impossible to straighten, as is the case for molybdenum wire. Bending of the wire may also happen accidentally, for example if the cutting edges of the wire cutter are slightly worn. Electrode wires of very small size, such as for example 0.1 mm or less, are completely without any rigidity, and are bent very easily, such that self-centering threading devices according to the present invention which apply to the end of the wire forces tending to align the end of the wire with a threading aperture through a workpiece have many applications.

When using electrode wires made of copper, brass, steel or tungsten, it often happens that, after the electrode wire has been threaded or rethreaded through the workpiece, the wire guide members are not exactly aligned with the axis of the aperture in the workpiece. When the wire is held taut after having been engaged at its end into the wire conveying mechanism, the wire is pushed against the edge of the aperture through the workpiece, thus causing a short circuit between the wire and the workpiece which prevents triggering the electrical discharges. Means should therefore be provided for detecting short circuits, after threading or rethreading the electrode wire between the electrode wire and the workpiece, and for displacing the electrode wire relative to the workpiece according to a systematic program along concentric circles, for examples, spirals or any other path until contact between the electrode wire and the workpiece is no longer detected. In addition, other systems may be provided for returning the workpiece relative to the electrode wire to a starting position prior to threading the wire through the workpiece, returning the wire to the position occupied at the time of an accidental rupture, and for continuing the cut according to the program.

When using an electrode wire provided with a superficial film of metallic oxide, triggering of electrical discharge can be re-established even though the wire may be in physical contact with the workpiece, and there is therefore no requirement for an electric contact detecting device to prevent short circuits when re-establishing machining pulses.

Having thus described the present invention by way of examples of structure, given as illustrative examples only and not in a limitative sense, modifications whereof will be apparent to those skilled in the art, what is claimed as new is as follows:

1. A method for threading the end of the electrode wire of a travelling wire EDM apparatus through an aperture in a workpiece, said method comprising placing an enclosure surrounding said end of said wire with an open end of said enclosure surrounding said aperture and in engagement with a surface of said workpiece such as to form a substantially leakproof junction between the open end of said enclosure and said workpiece surface, introducing said end of said wire in said enclosure such that said end of said wire is disposed proximate the inlet of said aperture, introducing a pressurized fluid in said enclosure for causing a high velocity stream of said fluid radially converging towards the inlet of said aperture, feeding the end of said wire towards the inlet of said aperture in said radially converting fluid flow, and pushing said end of said wire through said aperture.

2. The method of claim 1 further comprising lifting said enclosure from said workpiece after threading said end of said wire through said aperture and prior to effecting a cutting operation in said workpiece by electrical discharges.

3. The method of claim 2 wherein said fluid is a fluid different from the machining fluid, and further comprising interrupting the flow of said different fluid, and establishing a flow of said machining fluid after passing said end of said wire through said aperture.

4. In a travelling wire EDM apparatus, a mechanism for threading the end of an electrode wire through an aperture in a workpiece, said mechanism coprising an enclosure having an open end movable in engagement with a surface of said workpiece and surrounding the inlet of said aperture in said workpiece, means for introducing the end of said wire in said enclosure with the end of said wire disposed proximate the inlet of said aperture, means for introducing a pressurized fluid within said enclosure for causing said fluid to flow at high velocity radially towards said inlet of said aperture such as to center the end of said wire relative to said aperture, and means for feeding said end of said wire through said aperture, wherein said enclosure comprises a cylinder having an end wall, an opening through said end wall for passing therethrough the end of said electrode wire, first conduit means for supplying a first fluid under pressure to the interior of said cylinder for flowing through said aperture, a converging nozzle disposed coaxially to said aperture, and second conduit means for supplying said converging nozzle with a second fluid such as to center the end of said wire relative to said aperture in said workpiece.

5. The mechanism of claim 4 wherein said first fluid is an EDM machining fluid and said second fluid is a threading fluid of high viscosity.

6. In a travelling wire EDM apparatus, a mechansim for threading the end of an electrode wire through an aperture in a workpiece, said mechanism comprising an enclosure having an open end movable in engagement with a surface of said workpiece and surrounding the inlet of said aperture in said workpiece, means for introducing the end of said wire in said enclosure with the end of said wire disposed proximate the inlet of said aperture, means for introducing a pressurized fluid within said enclosure for causing said fluid to flow at high velocity radially towards said inlet of said aperture such as to center the end of said wire relative to said aperture, and means for feeding said end of said wire through said aperture, wherein said enclosure comprises a cylinder having an end wall, an opening through said end wall through which the end of said wire is threaded, an annular member disposed below said end wall, an elastic bellows connecting the end of said cylinder and said annular member, means for introducing pressurized fluid within said bellows and a converging funnel-shaped opening in said annular member for converging the flow of said fluid towards the inlet of said aperture in said workpiece, wherein said bellows is caused to expand upon introduction of fluid therein fro displacing said annular member toward said workpiece.

7. The mechanism of claim 6 wherein said cylinder has a generally conical portion surrounding said opening in said end wall projecting within said funnel-shaped opening in said ring.

8. The mechanism of claim 6 wherein said bellows resiliently retracts said annular member from said workpiece when the flow of said pressurized fluid to the interior of said bellows is shut off.

* * * * *

UNITED STATES PATENT AND TRADEMARK OFFICE
CERTIFICATE OF CORRECTION

PATENT NO. : 4,495,393
DATED : January 22, 1985
INVENTOR(S) : Johan Janicke

It is certified that error appears in the above–identified patent and that said Letters Patent are hereby corrected as shown below:

Column 5, line 47, correct the spelling of "becomes".

Column 10, line 18, change "converting" to --converging--.

Column 10, line 32, change "coprising" to --comprising--.

Column 12, line 1, change "fro" to --for--.

Signed and Sealed this

Twenty-fifth Day of June 1985

[SEAL]

Attest:

DONALD J. QUIGG

Attesting Officer     Acting Commissioner of Patents and Trademarks